US012183254B2

(12) United States Patent
Huang et al.

(10) Patent No.: US 12,183,254 B2
(45) Date of Patent: Dec. 31, 2024

(54) CONTROL METHOD AND ELECTRONIC DEVICE

(71) Applicant: Lenovo (Beijing) Limited, Beijing (CN)

(72) Inventors: Zhangqing Huang, Beijing (CN); Qiyang Wang, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 0 days.

(21) Appl. No.: 18/183,654

(22) Filed: Mar. 14, 2023

(65) Prior Publication Data

US 2023/0419875 A1 Dec. 28, 2023

(30) Foreign Application Priority Data

Jun. 27, 2022 (CN) ......................... 202210744134.9

(51) Int. Cl.
*G09G 3/20* (2006.01)
*G09G 5/10* (2006.01)

(52) U.S. Cl.
CPC ............. *G09G 3/2092* (2013.01); *G09G 5/10* (2013.01); *G09G 2320/0223* (2013.01); *G09G 2320/0247* (2013.01); *G09G 2320/062* (2013.01); *G09G 2320/0626* (2013.01); *G09G 2330/021* (2013.01); *G09G 2340/0435* (2013.01)

(58) Field of Classification Search
None
See application file for complete search history.

(56) References Cited

U.S. PATENT DOCUMENTS

| | | | | |
|---|---|---|---|---|
| 2006/0164424 | A1* | 7/2006 | Wiley | G09G 5/393 345/539 |
| 2014/0198138 | A1* | 7/2014 | Nambi | G09G 3/36 345/87 |
| 2014/0210801 | A1* | 7/2014 | Li | G09G 3/20 345/204 |
| 2014/0237511 | A1* | 8/2014 | Baek | H04N 21/6547 725/34 |
| 2014/0347340 | A1* | 11/2014 | Tse | G06F 11/0736 345/82 |
| 2016/0086557 | A1* | 3/2016 | Watanabe | G09G 3/2007 345/691 |
| 2018/0261190 | A1* | 9/2018 | Yi | G06F 9/451 |
| 2019/0172427 | A1* | 6/2019 | Saini | G09G 5/18 |
| 2021/0248973 | A1* | 8/2021 | Jeon | G09G 5/005 |
| 2022/0051599 | A1* | 2/2022 | Kang | G09G 3/20 |
| 2022/0051630 | A1* | 2/2022 | Shen | G09G 3/3291 |
| 2022/0060607 | A1* | 2/2022 | Huang | H04N 21/41407 |
| 2022/0246111 | A1* | 8/2022 | Lu | G09G 3/20 |
| 2022/0309977 | A1* | 9/2022 | Lu | G09G 3/20 |
| 2023/0071987 | A1* | 3/2023 | Zeng | G06F 3/147 |

* cited by examiner

*Primary Examiner* — Dorothy Harris
(74) *Attorney, Agent, or Firm* — ANOVA LAW GROUP, PLLC

(57) ABSTRACT

A control method includes obtaining a brightness level parameter of a display screen, controlling a refresh rate of the display screen at a target refresh rate if the brightness level parameter is less than or equal to a target brightness level, and obtaining display data based on a target time interval corresponding to the target refresh rate. The display data obtained based on the target time interval includes at least two adjacent display data that are the same.

15 Claims, 3 Drawing Sheets

CONTROL METHOD AND ELECTRONIC DEVICE

CROSS-REFERENCES TO RELATED APPLICATION

This application claims priority to Chinese Patent Application No. 202210744134.9 filed on Jun. 27, 2022, the entire content of which is incorporated herein by reference.

FIELD OF TECHNOLOGY

The present disclosure relates to the field of data processing technology and, more specifically, to a control method and an electronic device.

BACKGROUND

When the display screen display data at a lower brightness level, in order to reduce power consumption, the refresh rate of the display screen will generally be reduced. However, reducing the refresh rate of the display screen can easily lead to flickering on the display screen. That is, switching the refresh rate of the display screen when the display screen is in low brightness level causes the screen to flicker, which affects the user experience.

SUMMARY

One aspect of this disclosure provides a control method. The control method includes obtaining a brightness level parameter of a display screen, controlling a refresh rate of the display screen at a target refresh rate if the brightness level parameter is less than or equal to a target brightness level, obtaining display data based on a target time interval corresponding to the target refresh rate. The display data obtained based on the target time interval includes at least two adjacent display data that are the same.

Another aspect of this disclosure provides an electronic device. The electronic device includes a display screen and a processor. The processor is configured to obtain a brightness level parameter of the display screen, control a refresh rate of the display screen at a target refresh rate if the brightness level parameter is less than or equal to a target brightness level, and obtain display data based on a target time interval corresponding to the target refresh rate. The display data obtained based on the target time interval includes at least two adjacent display data that are the same.

Another aspect of this disclosure provides a non-transitory computer-readable storage medium containing computer-executable instructions that, when executed by a processor, cause the processor to obtain a brightness level parameter of the display screen, control a refresh rate of the display screen at a target refresh rate if the brightness level parameter is less than or equal to a target brightness level, and obtain display data based on a target time interval corresponding to the target refresh rate. The display data obtained based on the target time interval includes at least two adjacent display data that are the same.

DETAILED DESCRIPTION

Hereinafter, aspects, features, and embodiments of the present disclosure will be described with reference to the accompanying drawings. Such description is illustrative only but is not intended to limit the scope of the present disclosure. In addition, it will be understood by those skilled in the art that various modifications in form and details may be made therein without departing from the spirit and scope of the present disclosure.

When the display screen displays data at a lower brightness level, in order to further reduce the data display power consumption of the display screen, the refresh rate of the display screen is generally reduced. After reducing the refresh rate of the display screen, the power consumption of data refresh can be reduced to a certain extent. However, the low refresh rate can cause data freeze or flickering on the display screen, which affects the data display effect of the display screen.

In view of the foregoing, embodiments of the present disclosure provide a control method and an electronic device. The control method provided by the embodiments of the present disclosure can be realized by a processor of the electronic device. The processor may be at least one of an application specific integrated circuit (ASIC), a digital signal processor (DSP), a digital signal processing device (DSPD), a programmable logic device (PLD), a field programmable gate array (FPGA), a central processing unit (CPU), a controller, a microcontroller, and a microprocessor.

In some embodiments, the electronic device may include a computer device, such as a personal computer (PC) or a server equipment. In some embodiments, the electronic device may include a mobile electronic device, such as a device with a display screen such as a smartphone or a smart watch. In some embodiments, the electronic device may be a device having a display screen such as a TV, which is not limited in the embodiments of the present disclosure.

Figure 1:
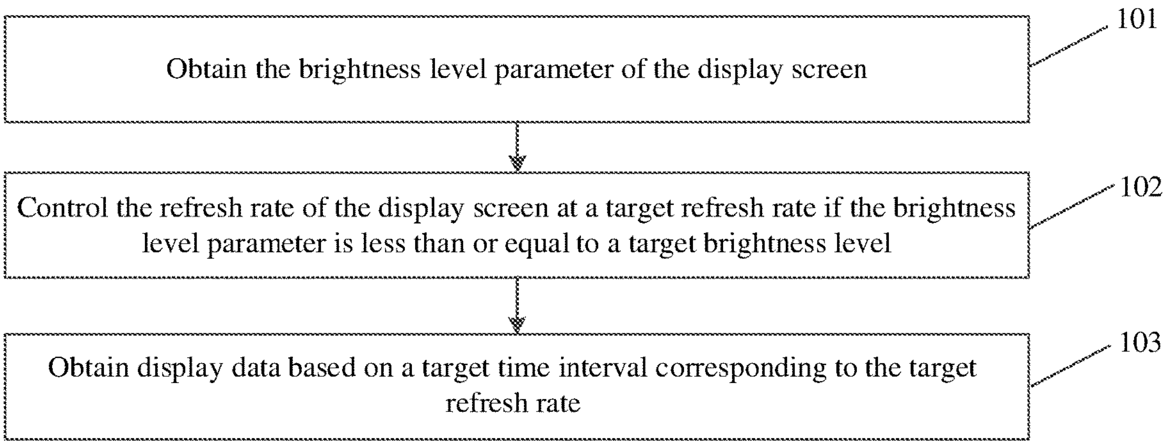
FIG. 1 is a flowchart of a control method according to an embodiment of the present disclosure.

FIG. 1 is a flowchart of a control method according to an embodiment of the present disclosure. The method will be described in detail below.

101, obtaining the brightness level parameter of the display screen.

In some embodiments, the display screen may include a display device that is electrically connected to the electronic device. For example, the display screen may be a display screen in a display, and the electronic device may be a computer device. An electrical connection may be established between the display screen and the electronic device, and the electronic device may send to-be-displayed data to the display for the display screen of the display to output the data.

In some embodiments, the display screen may be integrated with the electronic device. For example, the display screen of a smartphone may be integrated with the body of the smartphone.

In some embodiments, the brightness level parameter of the display screen may include the current brightness level of the display screen. For example, the brightness level parameter of the display screen may also include parameters such as color temperature and contrast of the display screen.

In some embodiments, the brightness level parameter may change with the brightness level of the environment where the electronic device is located. For example, the electronic device may obtain the dimming of the ambient brightness level through an ambient light sensor, and automatically adjust the brightness level of the display screen to a lower brightness level corresponding to the ambient brightness level. Alternatively, the user may adjust the brightness level of the display screen to a lower brightness level based on the needs through operating buttons, virtual controls, or gestures. That is, the brightness level parameter may be set by the user based on the user's personal usage habits, which is not limited in the embodiments of the present disclosure.

102, controlling the refresh rate of the display screen at a target refresh rate if the brightness level parameter is less than or equal to a target brightness level.

In some embodiments, if the brightness level parameter is greater than the target brightness level, the display screen may work at the target refresh rate.

In some embodiments, the brightness level parameter may be a brightness level threshold that has been set by the electronic device. When the current brightness level parameter is greater than or equal to the target brightness level, the refresh rate of the display screen may be locked at the target refresh rate. For example, the display screen with the organic light emitting display (OLED) technology may lock the refresh rate at 120 Hz at low brightness level, which eliminates the screen flicking that may be caused by lowering the refresh rate at low brightness level.

In some embodiments, the electronic device may be configured to learn at least one type of information from the brightness level of the environment where the electronic device is located, such as the user's personal usage habits, the user's setting parameters, and the adjustable range of the brightness level of the display screen, obtain the learning result, and determine the target brightness level set based on the learning result. In some embodiments, the target brightness level set may include at least one target brightness level. In some embodiments, when the target brightness level set includes a plurality of target brightness level, each target brightness level may be different. In some embodiments, the target brightness level in the target brightness level set may correspond to the usage scenario of the electronic device or the brightness level of the environment where the electronic device is located. That is, the target brightness level corresponding to different usage scenarios or different ambient brightness level may be different.

In some embodiments, the electronic device may be configured to adjust the brightness level parameter of the display screen in real time based on the brightness level of the environment where the electronic device is located, and determine whether the adjusted brightness level parameter is less than or equal to the target brightness level in real time.

In some embodiments, the target refresh rate may be less than or equal to a first refresh rate. The first refresh rate may include the highest refresh rate supported by the hardware of the display screen.

In some embodiments, the target refresh rate may be equal to a second refresh rate, and the second refresh rate may be less than or equal to the first refresh rate. The second refresh rate may include the refresh rate at the nth moment, where the nth moment may be the moment when the brightness level parameter of the display screen is greater than the target brightness level. In some embodiments, controlling the refresh rate of the display screen at the target refresh rate may be an operation performed at the n+1th moment. That is, the second refresh rate may be the refresh rate at the previous moment when the refresh rate of the display screen is controlled at the target refresh rate. In this way, when the brightness level parameter of the electronic device changes, the refresh rate of the display screen is not adjusted, thereby reducing the probability of the data displayed on the display screen being frozen. In some embodiments, n may be an integer greater than or equal to 1.

In the embodiments of the present disclosure, the target brightness level may be used as a condition. In the process of adjusting the display screen of the electronic device from high brightness level to low brightness level, if the brightness level parameter of the display screen is less than or equal to the target brightness level, the refresh rate of the display screen before switching to the target brightness level may be locked at the target refresh rate. For example, the target refresh rate before the display screen switches to the target brightness level, that is, the second refresh rate, may include the first refresh rate. In the process of adjusting the display screen of the electronic device from low brightness level to high brightness level, since the refresh rate has not been switched when it is less than or equal to the target brightness level, the target refresh rate may still work if it is greater than the target brightness level. Subsequently, after the brightness level parameter of the electronic device is greater than the target brightness level, the display screen refresh rate may be dynamically adjusted or switched based on any one of operation, display content, and application program, or the target refresh rate may be locked to a fixed value without dynamically changing the target refresh rate.

103, obtaining display data based on a target time interval corresponding to the target refresh rate.

In some embodiments, in the display data obtained based on the target time interval, at least two adjacent display data may be the same.

In some embodiments, the display data may include static data or dynamic data. In some embodiments, the static data may include data that does not change within a specified time, such as pictures, text files, etc. In some embodiments, the dynamic data may include data that changes within a specified time, such as video data, etc. In some embodiments, the specified time may be one second, which is not limited in the embodiments of the present disclosure.

In some embodiments, the displayed data may include the data displayed by the user's application, such as the web page data displayed by the browser installed by the user. In some embodiments, the display data may include data displayed by system applications, such as file directory data displayed by the file management system in the operating system of the electronic device.

In some embodiments, the target time interval and the target refresh rate may have a one-to-one relationship. For example, the nth target time interval may correspond to the nth target refresh rate. In this way, after the target refresh rate is determined, the target time interval corresponding to the target refresh rate may be obtained.

In some embodiments, the target time interval may be the reciprocal of the target refresh rate.

In some embodiments, the display data obtained based on the target time interval including at least two adjacent display data that are the same may include the display data obtained at the kth moment being the same as the display data obtained at the k+1th moment, and the display data obtained at the k+2th moment being the same as the display data obtained at the k+3th moment. For example, the kth moment may include a moment corresponding to the kth target time interval, and the k+1th moment may include a moment corresponding to the k+1th target time interval. In some embodiments, k may be an integer greater than or equal to 1.

In some embodiments, the display data obtained based on the target time interval including at least two adjacent display data that are the same may include three display data obtained at the moments corresponding to three adjacent target time intervals being the same. For example, the display data obtained at the kth moment may be the same as the display data obtained at the k+1th moment and the display data obtained at the k+2th moment.

In some embodiments, the display data obtained based on the target time interval including at least two adjacent display data that are the same may include m display data obtained at the moments corresponding to m consecutive target time intervals being the same. In some embodiments, m may be an integer greater than 3.

In some embodiments, obtaining the display data based on the target time interval corresponding to the target refresh rate may include: obtaining the display data from a specified storage space based on the target time interval, and sending the display data to the display screen, such that the display screen can refresh and display the display data based on the target refresh rate. For example, the display data obtained based on at least two consecutive target time intervals may be the same, therefore, when the display screen performed refresh display operations based on the target refresh rate, the display data corresponding to at least two refresh display operations may be the same.

That is, in the control method provided by the embodiments of the present disclosure, by extending the generation interval of the display data, that is, reducing the frequency of display data generation, when the refresh rate of the display screen is controlled at the target refresh rate, not only the probability of display data freeze can be reduced, but the power consumption for generating the display data can also be reduced, thereby reducing the power consumption of the data display as a whole.

Consistent with the present disclosure, when the brightness level parameter of the display screen is less than or equal to the target brightness level, the refresh rate of the display screen may be controlled at the target refresh rate, the display data may be obtained based on the time interval corresponding to the target refresh rate, and the display data obtained based on the target refresh rate may include at least two adjacent display data that are the same.

Therefore, the control method provided by the embodiments of the present disclosure will not cause flicking of the display screen as the refresh rate of the display screen is not reduced or switched when the brightness level parameter of the display screen decreases. Instead, the time interval at which the display data for display on the display screen can be extended at the current refresh rate, that is, the generation frequency of the display data for display on the display screen is reduced, to effectively reduce the power consumption of the electronic device when the display screen of the electronic device is working at low brightness level at the target refresh rate. Since the refresh rate of the display screen can be controlled at the target refresh rate, the electronic device can effectively reduce the processing power consumption of the electronic device while ensuring the display effect of the display data when the display screen is at low brightness level.

Based on the foregoing embodiments, the control method provided by the embodiments of the present disclosure may further include: updating the display data in the buffer space based on the control time interval.

In some embodiments, the target time interval may be smaller than the control time interval, and the buffer space may be used for the display screen to obtain the display data.

In some embodiments, after the control time interval is determined, at least one fine-tuning can be performed based on the remaining data processing resources of the electronic device, power reserve, user's personal habits, and usage scenarios. In some embodiments, the remaining data processing resources may include remaining data processing resources in a CPU or a graphics processing unit (GPU) of the electronic device. In some embodiments, the power reserve may include the remaining power of the electronic device. In some embodiments, the suage scenarios may include the scene where the display screen and/or the electronic device is currently located, such as a meeting scene, a dining scene, or a resting scene, etc.

In some embodiments, when the data processing resources are less than a resource threshold or the power reserve is less than a power threshold, the control time interval may be extended, but the degree of influence of the extended control time interval on the display effect of the displayed data should be less than a preset threshold.

In some embodiments, the target time interval may be used as a reference in the process of determining the control time interval, and the target time interval may be smaller than the control time interval.

In some embodiments, the buffer space may include graphics card memory or frame buffer, which can be used to store display screen generated by application programs or systems. After the display screen obtains the display data from the buffer space, the display data may be refreshed and drawn in the display area.

In some embodiments, since the target time interval is smaller than the control time interval, updating the display data in the buffer space based on the control time interval may include controlling the application program or the system to update the display data in the buffer space at longer intervals. However, the display screen may still obtain the display data from the buffer space at shorter intervals, such that at least two display data obtained by the display screen consecutively may be the same. In some embodiments, the number of times the display screen obtains the same display data may be determined based on the relationship between the control time interval and the target time interval.

Consistent with the present disclosure, the display data in the buffer space can be updated based on the control time interval, such that the display screen can obtain display data from the buffer space based on the target time interval. In addition, the target time interval can be smaller than the control time interval.

Since the target time interval can be shorter than the control time interval, the time interval for the display screen to obtain the display data from the buffer space may be shorter than the time interval for the display data generation and update. That is, the electronic device may generate and update the display data at a relatively long time interval, thereby reducing the amount of calculations for generating and updating the display data, thereby reducing power consumption for generating and updating the display data. Further, the display screen may still obtain and refresh the display data at a relatively short time interval, such that the display effect of the display data can be improved, and the probability of flickering caused by the freeze of the display data can be reduced.

Based on the foregoing embodiments, in the control method provided by the embodiments of the present disclosure, the control time interval may be a multiple of the target time interval.

In some embodiments, the control time interval may be an integer multiple of the target time interval. For example, the control time interval may be N time the target time interval. In this way, after the display data is updated to the buffer space at the control time interval, in the display data obtained at the target time interval, the adjacent N display data may be the same. In some embodiments, N may be an integer greater than 1.

In some embodiments, the control time interval may be a non-integer multiple of the target time interval. For example, the control time interval may be 1.5 times the target time interval. In this way, when the display data is updated to the buffer space at the control time interval, in the display data obtained at the target time interval, two adjacent display data may be the same or different. At this time, the display data displayed on the display screen may be slightly stuttering.

In some embodiments, the multiple relationship between the control time interval and the target time interval may be determined based on the actual data display requirements. For example, when displaying static data, the control time interval may be a first multiple of the target time interval, while when displaying dynamic data, the control time interval may be a second multiple of the target time interval, where the first multiple may be greater than the second multiple.

In some embodiments, the multiple relationship between the control time interval and the target time interval may be determined based on the user's data refresh operation. For example, the display screen may be displaying text data, but the user may control the scrolling display of the text data at a first rate. At this time, there may be a third multiple between the control time interval and the target time interval. The third multiple may be less than or equal to the page update frequency corresponding to the first rate, thereby reducing the probability of stuttering during the scrolling display of text data.

Consistent with the present disclosure, the control time interval may be a multiple of the target time interval. Therefore, after determining the target time interval, the control time interval may be flexibly determined based on the actual power consumption control requirements, thereby realizing the flexible control of the generation of the display data and cache process.

Based on the foregoing embodiments, in the control method provided by the embodiments of the present disclosure, updating the display data in the buffer space based on the control time interval may include controlling the target application to update the display data in the buffer space based on the control time interval in response to the target application receiving a synchronization signal.

In some embodiments, if the target application does not receive the synchronization signal, the operation of controlling the target application to update the display data in the buffer space based on the control time interval may not be performed.

In some embodiments, the target application may be at least one of a system application or a user application of the electronic device.

In some embodiments, the synchronization signal may include a signal instructing the target application to update the display data in the buffer space. For example, the synchronization signal may include the control time interval.

In some embodiments, the synchronization signal may include a vertical sync (Vsync) signal, which can be used to control the frame rate of the display data of the target application. That is, the rate at which the target application generates the display data through the CPU or the GPU. In the embodiments of the present disclosure, the synchronization signal may be used to control whether the target application updates the display data in the buffer space based on the control time interval.

In one example, when the display data obtained have at least two consecutive target time intervals that are the same. locking the refresh rate at 120 hz in a low brightness level for display screen, and controlling the generation frequency of the display data, which is generated by target application, in the buffer space for display on the display screen is reduced to ½, which simulate the effect of Vsync of 60 hz to target application. This significantly reduces the CPU/GPU power consumption. Similarly, when the display data obtained have three or four consecutive target time intervals that are the same, the simulated Vsync would be ⅓ or ¼ of the display frequency. Embodiments of the application thus reduce both flicker when refresh rate is changing in low brightness level and resolve certain power balance issue.

In some embodiments, controlling the target application based on the synchronization signal to update the display data in the buffer space based on the control time interval may include controlling the target application to generate the display data based on the control time interval in the synchronization signal, and updating the display data to the buffer space after the display data is generated.

In some embodiments, controlling the target application to generate the display data based on the control time interval in the synchronization signal may include the target application generating the kth display data when the kth control time interval is reached, and the target application suspending the data processing process when the kth control time interval is not reached.

Consistent with the present disclosure, when the target application received the synchronization signal, the target application can be controlled to update the display data in the buffer space based on the control time interval. In this way, the flexible control of display data generation and update to the buffer space of the target application can be realized, thereby realizing the flexible control of power consumption during the display data display process.

Figure 2:
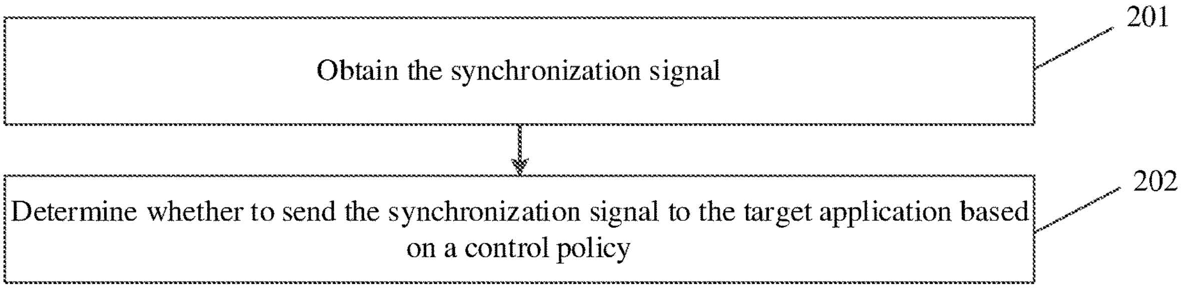
FIG. 2 is a flowchart of determining whether to send a synchronization signal to a target application according to an embodiment of the present disclosure.

Based on the foregoing embodiments, the control method provided by the embodiments of the present disclosure may also include the process shown in FIG. 2. FIG. 2 is a flowchart of determining whether to send the synchronization signal to the target application according to an embodiment of the present disclosure. The process will be described below.

201, obtaining the synchronization signal.

In some embodiments, the synchronization signal may be generated after the target application is activated.

202, determining whether to send the synchronization signal to the target application based on a control policy.

In some embodiments, the control policy may be set by the user. For example, the control policy may be determined by the electronic device learning the scene where the electronic device is located and the usage habits of the user.

In some embodiments, whether to activate the control policy may be based on a target condition. In some embodiments, when the target condition is met, the control policy may be activated. In some embodiments, when the target condition is not met, the control policy may not be activated.

In some embodiments, the target condition may include the power reserve of the electronic device being less than or equal to a power threshold. Correspondingly, when the power reserve of the electronic device is less than or equal to the power threshold, the control policy may be activated, and when the power reserve of the electronic device is greater than the power threshold, the control policy may not be activated.

In some embodiments, the target condition may include the remaining data processing resources of the CPU or GPU of the electronic device being less than or equal to a resource threshold. Correspondingly, when the remaining data processing resources of the CPU or GPU of the electronic device is less than or equal to the resource threshold, the control policy may be activated to reduce the number of times the target application generates the display data through the CPU or GPU, thereby reducing the occupation of the CPU or GPU data processing resources. When the remaining data processing resources is greater than the resource threshold, the control policy may not be activated.

In some embodiments, determining whether to activate the control policy may be based on the user's setting information. For example, if the user's setting information includes the default startup control policy, the control policy will be started regardless of whether power reserve is less than or equal to the power threshold, or whether the remaining data processing resources is less than or equal to the resource threshold.

Consistent with the present disclosure, after obtaining the synchronization signal, whether to send the synchronization signal to the target application may be determined based on the control policy. In this way, the flexible control on whether to send the synchronization signal can be realized by adjusting the control policy, thereby realizing the flexible control on updating the display data in the buffer space by the target application.

Based on the foregoing embodiments, in the control method provided by the embodiments of the present disclosure, determining whether to send the synchronization signal to the target application based on the control policy may include determining whether the application is the target application, if the application is the target application, determining whether to send the synchronization signal to the target application based on the control policy.

In some embodiments, if the application is not the target application, the control policy may not be activated.

In some embodiments, the application may include any application in the electronic device that is in the waiting state and has data display requirements. For example, the application may include any application that is already running in the electronic device and has data display requirements, which is not limited in the embodiments of the present disclosure.

In some embodiments, the application identification set of the target application may be stored in the storage space of the electronic device, that is, a whitelist including at least one target application. When any application is launched, the application identification of the application may be obtained, and based on the matching degree between the application identification and the application identification in the whitelist, whether the application is the target application may be determined.

In some embodiments, the whitelist may be determined based on the operating characteristics of the application or set by the user, which is not limited in the embodiments of the present disclosure.

In some embodiments, if the application is the target application, the control policy may be activated, and whether to send the synchronization signal to the target application may be determined based on the synchronization signal sending strategy in the control policy.

Consistent with the present disclosure, when the application is the target application, whether to send the synchronization signal to the target application may only be based on the control policy, thereby realizing the precise control of the activation of the control policy based on the target application.

Figure 3:
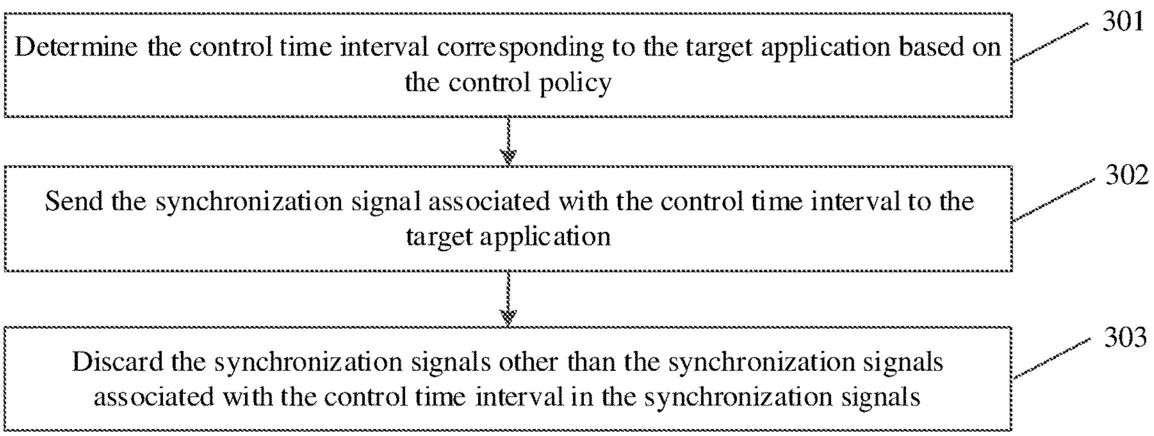
FIG. 3 is another flowchart of determining whether to send the synchronization signal to the target application according to an embodiment of the present disclosure.

Based on the foregoing embodiments, in the control method provided by the embodiments of the present disclosure, determining whether to send the synchronization signal to the target application based on the control policy may be implemented by the process shown in FIG. 3. FIG. 3 is another flowchart of determining whether to send the synchronization signal to the target application according to an embodiment of the present disclosure. The process will be described in detail below.

301, determining the control time interval corresponding to the target application based on the control policy.

In some embodiments, the control policy may include a one-to-one association relationship between the control time interval and the identifier of the target application. For example, the first control time interval may correspond to the first target application, and the second control time interval may correspond to the second target application. In some embodiments, after the target application is determined, the target association relationship may be determined from the association relationship described above based on the matching relationship between the target application identifier and the target application identifier in the association relationship described above, and the control time interval in the target association relationship may be determined as the control time interval corresponding to the current target application.

In some embodiments, the control time intervals corresponding to different target applications may have different lengths. For example, the first control time interval may be different from the second control time interval.

In some embodiments, the length of the control time interval corresponding to the target application may be related to the data type of the target data associated with the target application. For example, the target data may include the data processed, loaded, or displayed by the target application, such as the control time interval corresponding to the video data, which can be shorter than the control time interval corresponding to the static text data. In this way, the control time interval can be determined or adjusted based on the data type of the target data associated with the target application.

In some embodiments, the control time interval may include a time interval when the degree of impact on the loading or display effect of the target data associated with the target application is less than or equal to a preset threshold. For example, when the target data is video data, the control time interval may include a time interval that does not cause video data to freeze.

302, sending the synchronization signal associated with the control time interval to the target application.

In some embodiments, the synchronization signal associated with the control time interval may include at least part of the synchronization signal derived from the synchronization signal at the control time interval.

In some embodiments, if the control time interval is the same as the time interval corresponding to the synchronization signal, the synchronization signal associated with the control time interval may include all synchronization signals. For example, the time interval corresponding to the synchronization signal may include the time interval between adjacent synchronization signals.

In some embodiments, the control time interval may be N times the tine interval corresponding to the synchronization signal. That is, the synchronization signal associated with the control time interval may be a partial synchronization signal uniformly obtained from the synchronization signal at the control time interval. For example, when N is an odd or even number, the synchronization signal associated with the control time interval may include a synchronization signal obtained by twice down sampling the synchronization signal. That is, the frequency of the synchronization signal associated with the control time interval may be ½ of the frequency of the synchronization signal. In another example, when N is an integer greater than 2, the control time interval may be N times the time interval corresponding to the synchronization signal, and the frequency of the synchronization signal associated with the control time interval may be 1/N of the frequency of the synchronization signal. In some embodiments, N may be in integer greater than or equal to 1.

In some embodiments, the value of N may be determined or adjusted based on the target application or the type of target data associated with the target application, which is not limited in the embodiments of the present disclosure.

303, discarding the synchronization signals other than the synchronization signals associated with the control time interval in the synchronization signals.

Consistent with the present disclosure, when determining the control time interval corresponding to the target application based on the control policy, the synchronization signal associated with the control time interval may be sent to the target application, and the synchronization signals other than the synchronization signals associated with the control time interval may be discarded in the synchronization signals.

Therefore, the control method provided by the embodiments of the present disclosure can determine the control time interval corresponding to the target application based on the control policy, and the final synchronization signal sent may also be a synchronization signal associated with the control time interval. In this way, the dual control of the target application and the control time interval through the control policy can be realized, and the precise control of the synchronization signal sent to the target application can be realized, thereby realizing the precise control of the power consumption during the display data display process.

Based on the foregoing embodiments, in the task processing method provided by the embodiments of the present disclosure, obtaining the display data based on the target time interval corresponding to the target refresh rate may include obtaining the display data based on the target time interval if the application corresponding to the display data is the target application.

In some embodiments, if the application corresponding to the display data is not the target application, the operation of obtaining the display data based on the target time interval may not be performed.

In some embodiments, if the application corresponding to the display data is the target application and the display data of the target application is of a specified type, the display data may be obtained based on the target time interval. For example, the specified type may include data whose data update rate is greater than or equal to a rate threshold, such as video data.

Consistent with the present disclosure, the display data may be obtained based on the target time interval only when the application corresponding to the display data is the target application, thereby realizing the target control of power consumption during display data display.

Figure 4:
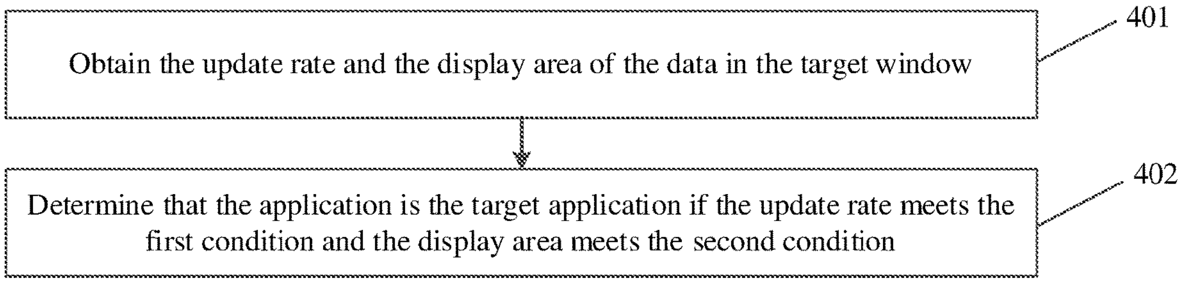
FIG. 4 is a flowchart of determining the target application according to an embodiment of the present disclosure.

Based on the foregoing embodiments, the control method provided by the embodiments of the present disclosure may also include the process shown in FIG. 4. FIG. 4 is a flowchart of determining the target application according to an embodiment of the present disclosure. The process will be described in detail below.

401, obtaining the update rate and the display area of the data in a target window.

In some embodiments, the target window may include a data display window of an application corresponding to the display data.

In some embodiments, the target window may cover at least part of the display data of the display screen. For example, the target window may include a floating window.

In some embodiments, at least the display data may be displayed in the target window. In some embodiments, other data may also be displayed in the target window. For example, the other data may include control data of the target window.

In some embodiments, the update rate may include the update rate of the individual data displayed in the target window. For example, the update rate may include the number of frames at which each data in the target window is updated per unit time, such as the number of frames at which video data is refreshed per unit time.

In some embodiments, the update rate may be determined based on the type of data displayed in the target window. For example, the update rate of video data may be greater than the update rate of text data.

In some embodiments, the update rate may be determined based on the touch operation on the target window. For example, fast sliding of text data in the target window may speed up the update rate of text data may be accelerated from a first rate to a second rate.

In some embodiments, the update rate may be determined based on the state of the data displayed in the target window. For example, the video data may be currently in the pause playback state, while the text data may be in the scrolling display state. In this case, a third rate may be less than a fourth rate, where the third rate may be the update rate of the video data, and the fourth rate may be the update rate of the text data.

In some embodiments, the display area may include the aera of the display area occupied by each data in the target window. For example, the display area may be determined based on the layout of window elements used to load various data in the target window.

402, determining that the application is the target application if the update rate meets a first condition and the display area meets a second condition.

In some embodiments, the first condition may be that the update rate of the first data is greater than the update rate of the second data, and the second condition may be that the first display area is smaller than the second display area. The first display area may include the display area of the first data in the target window, the second display area may include the display area of the second data in the target window, and the data displayed in the target window may include at least the first data and the second data.

In some embodiments, if the update rate does not meet the first condition or the display area does not meet the second condition, the application may be determined as not the target application.

In some embodiments, the update rate of the first data and the update rate of the second data may include the frame rate of the first data and the frame rate of the second data, that is, the number of frames that the first data and the second data may be updated in a unit time.

In some embodiments, the update rate of the first data being greater than the update rate of the second data may include that when the first data in the first state and the second data is in the second state, the update rate of the first data is greater than the update rate of the second data. For example, the first data may be animation data, the second data may be text data, the first state may be the animation playback state, and the second state may be the static text display state. That is, the update rate of the animation data in the playback state may be greater than the update rate of the text data in the static display state.

In some embodiments, the update rate of the first rate may be changed as the state of the first data changes, and the update rate of the second data may be changed as the state of the second data changes. For example, the first data may be animation data, but when the animation data switches from the animation state to the paused playback state, its update rate can be switched from a fifth rate to a sixth, and the fifth rate may be greater than the sixth rate.

In some embodiments, the first display area and the second display area may also change as the state of the first data and the second data changes. For example, if the first data is video data, then the first display area is the first mode may be smaller than the first display area in the second mode. For example, the first mode may be a reduced mode for window elements displaying video data, and the second mode may be a full-screen display mode for the video data.

In some embodiments, the application may switch from the target application to the non-target application, and also switch from the non-target application to the target application based on the display state of the data it loads.

In some embodiments, if the update rate meets the first condition and the display area meets the second condition, the update rate of the second data occupying a relatively large area in the target application may be smaller than the update rate of the second data occupying a relatively small area in the target window. For example, the second data at this time may be the display data in the foregoing embodiments.

In some embodiments, if the update rate meets the first condition and the display area meets the second condition, the update, in the application corresponding to the display data, the second may be the main output data of the application, and the first data may be the secondary output data of the application. At this time, the second data may be determined as the display data in the foregoing embodiments.

In some embodiments, after determining the first data and the display area, the display data in the buffer may be updated based on the control time interval provided by the foregoing embodiments, and the display screen may obtain the display data from the buffer space at the target time interval corresponding to the target refresh rate, and refresh and render the display data to the display area corresponding to the second display area. For example, the first data in the buffer space may be updated based on the target time interval, and the display screen may obtain the first data from the buffer space at the target time interval, and refresh and render the first data to the display area corresponding to the first display area, thereby realizing the sub-rate processing of various data in the target window.

Consistent with the present disclosure, after obtaining the update rate and the display area of the data in the target window, when the update rate meets the first condition, that is, the update rate of the first data is greater than the update rate of the second data, and the display area meets the second condition, that is, the first display area of the first data is smaller than the second display area of the second data, the application may be determined as the target application.

Therefore, the control method provided by the embodiments of the present disclosure can determine whether the application is the target application based on the update rate and the display area of various data in the application, that is, determine whether the target application is the target application based on the data actually loaded by the application, thereby realizing the accurate determination on whether the application is the target application.

Figure 5:
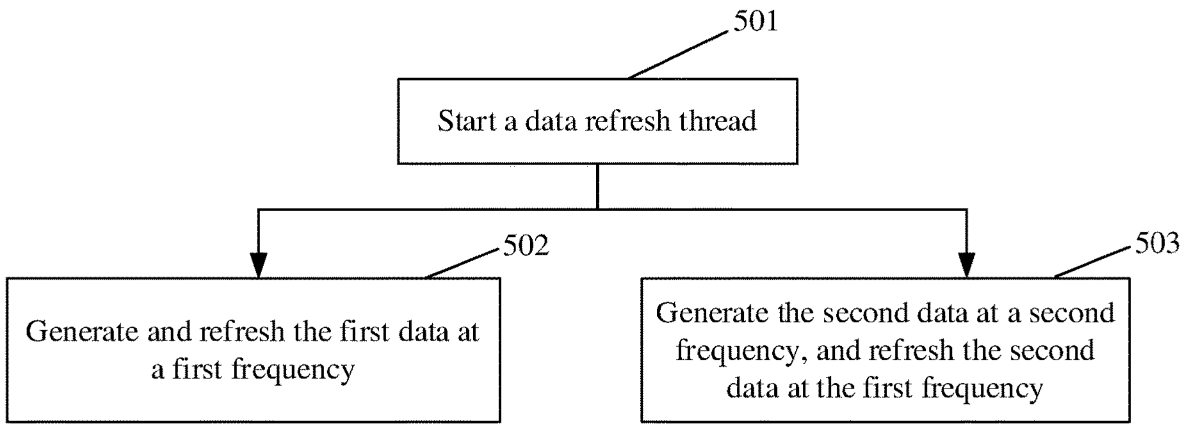
FIG. 5 is another flowchart of the control method according to an embodiment of the present disclosure.

Based on the foregoing embodiments, FIG. 5 is another flowchart of the control method according to an embodiment of the present disclosure. The method will be described in detail below.

501, starting a data refresh thread.

In some embodiments, the processor of the electronic device may be configured start the data refresh thread when the processor detects that the application is switched to the foreground running state.

In some embodiments, the processor of the electronic device may be configured to obtain the update rate and the display area of each data in the target window used by the application to output data.

In some embodiments, the processor of the electronic device may also be configured to determine that the application is the target application when the update rate meets the first condition and the display area meetings the second condition.

In some embodiments, the processor of the electronic device may be configured to detect whether the display parameter of the display screen is less than or equal to the target brightness level in real time, and control the refresh rate of the display screen at the target refresh rate when the display parameter is less than or equal to the target brightness level.

In some embodiments, the display parameter of the display screen being less than or equal to the target brightness level may be trigger by at least one factor of the brightness level change of the ambient light where the display screen is located, the brightness level adjustment instruction detected by the electronic device, and the insufficient power available for the electronic device.

502, generating and refreshing the first data at a first frequency.

In some embodiments, the processor of the electronic device may be configured to generate and refresh the first data at the first frequency.

In some embodiments, the first frequency may be the frequency of the target refresh rate in the foregoing embodiments, or may be the same frequency as the synchronization signal.

In some embodiments, generating the first data at the first frequency may include generating the first data at a target time interval corresponding to the first frequency. After the first data is generated, the first data may be updated to the buffer space based on the target time interval. For example, the display screen may obtain the first data from the buffer space at a time interval, such as a target time interval, corresponding to the first frequency, and refresh and display the first data. In some embodiments, the first frequency may be less than or equal to the target refresh rate.

503, generating the second data at a second frequency, and refreshing the second data at the first frequency.

In some embodiments, the processor of the electronic device may be configured to generate the second data at the second frequency, and refresh the second data at the first frequency.

In some embodiments, the time interval corresponding to the second frequency may be the control time interval provided in the foregoing embodiments. For example, when the control time interval is a multiple of the target time interval, the first frequency may be a multiple of the second frequency.

In the foregoing embodiments, the frequency of the synchronization signal sent to the target application may be the second frequency. For example, the frequency of the synchronization signal obtained by the electronic device may be the first frequency. That is, the synchronization signal of the second frequency may be obtained by sampling the synchronization signal of the first frequency.

In some embodiments, the target application may control the processor of the electronic device to generate the second data at the time interval corresponding to the second frequency, that is, the control time interval, and update the second data to the buffer space. The display screen may still obtain and refresh the second data from the buffer space at the time interval corresponding to the first frequency, that is, the target time interval.

In some embodiments, the second data that the display screen obtains from the buffer space at the target time interval may include at least two adjacent second data that are the same.

Consistent with the present disclosure, when it is determined that the application is the target application, the generation process of the first data and the second data displayed by the target application may be separately controlled. In addition, by reducing the generate rate of the second data with a relatively large display area, the power consumption of data processing during the running of the target application can be significantly reduced.

Figure 6:
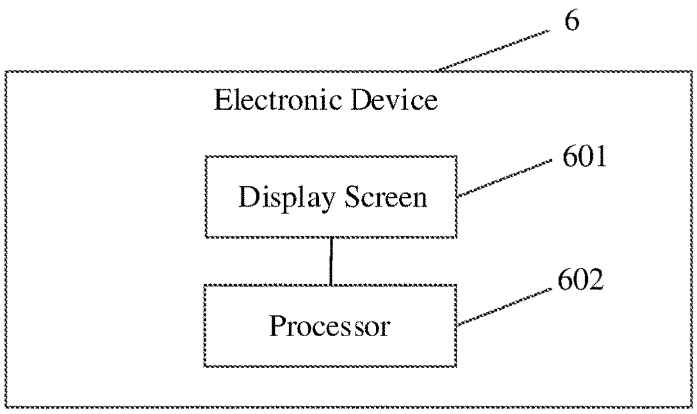
FIG. 6 is a schematic structural diagram of an electronic device according to an embodiment of the present disclosure.

Based on the foregoing embodiments, an embodiment of the present disclosure also provides an electronic device 6. FIG. 6 is a schematic structural diagram of the electronic device 6 according to an embodiment of the present disclosure. As shown in FIG. 6, the electronic device 6 includes a display screen 601 and a processor 602.

In some embodiments, the processor 602 may be configured to obtain the brightness level parameter of the display screen 601, control the refresh rate of the display screen 601 at the target refresh rate if the brightness level parameter is less than or equal to the target brightness level, and obtain the display data based on the target time interval corresponding to the target refresh rate. In some embodiments, the display data obtained based on the target time interval may include at least two adjacent display data that are the same.

In some embodiments, the processor 602 may be configured to update the display data in the buffer space based on the control time interval. The target time interval may be smaller than the control time interval, and the buffer space may be used for the display screen to obtain the display data.

In some embodiments, the control time interval may be a multiple of the target time interval.

In some embodiments, the processor 602 may be configured to control the target application to update the display data in the buffer space based on the control time interval if the target application receives the synchronization signal.

In some embodiments, the processor 602 may be configured to obtain the synchronization signal, and determine whether to send the synchronization signal to the target application based on the control policy.

In some embodiments, the processor 602 may be configured to determine whether the application is the target application, and determine whether to send the synchronization signal to the target application based on the control policy if the application is the target application.

In some embodiments, the processor 602 may be configured to determine the control time interval corresponding to the target application based on the control policy, send the synchronization signal associated with the control time interval to the target application, and discard the synchronization signal associated with the control time interval from the discarded synchronization signal. In some embodiments, the synchronization signal associated with the control time interval may include at least part of the synchronization signal derived from the synchronization signal at the control time interval.

In some embodiments, the processor 602 may be configured to obtain the update rate and the display area of the data in the target application, and determine that the application is the target application if the update rate meets the first condition and the display area meets the second condition. The target application may include the data display window of the application corresponding to the display data. The first condition may be that the update rate of the first data is greater than the update rate of the second data. The second condition may be that the first display area is smaller than the second display area. The first display area may include the display area of the first data in the target window. The second display area may include the display area of the second data in the target window. The data displayed in the target window may include at least the first data and the second data.

In some embodiments, the processor 602 may be configured to obtain the display data based on the target time interval if the application corresponding to the display data is the target application.

In some embodiments, the processor 602 may be at least one of ASIC, DSP, DSPD, PLD, FPGA, CPU, controller, microcontroller, and microprocessor.

In the electronic device 6 provided by the embodiments of the present disclosure will not cause flicking of the display screen as the refresh rate of the display screen is not reduced or switched when the brightness level parameter of the display screen decreases. Instead, the time interval at which the display data for display on the display screen can be extended at the current refresh rate, that is, the generation frequency of the display data for display on the display screen is reduced, to effectively reduce the power consumption of the electronic device when the display screen of the electronic device is working at low brightness level at the target refresh rate. Since the refresh rate of the display screen can be controlled at the target refresh rate, the electronic device can effectively reduce the processing power consumption of the electronic device while ensuring the display effect of the display data when the display screen is at low brightness level.

Based on the foregoing embodiments, an embodiment of the present disclosure also provides a computer-readable storage medium. The storage medium stores a computer program that, when being executed by a processor of an electronic device, causes the processor to perform the processes of the control method provided in any of the foregoing embodiments.

The above description of the various embodiments tends to emphasize the differences between the various embodiments, and the same or similarities may be referred to each other. For the brevity, the details are not repeated herein.

The methods described in each method embodiments provided in the present disclosure may be combined arbitrarily without conflict to obtain new method embodiments.

The features described in the product embodiments provided in the present disclosure may be combined arbitrarily without conflict to obtain new product embodiments.

The features described in each method or device embodiment provided in the disclosure may be combined arbitrarily without conflict to obtain a new method embodiment or device embodiment.

In some embodiments, the above-described computer-readable storage medium may include a read-only memory (ROM), a programmable read-only memory (PROM), an erasable programmable read-only memory (EPROM), an electrically erasable programmable read-only memory (EEPROM), a ferromagnetic random-access memory (FRAM), a flash memory, a magnetic surface memory, a CD, or a compact disc read-only memory (CD-ROM), etc. The above computer-readable storage medium may further include a variety of electronic apparatuses including one or any combination of the above-described memories, such as mobile phones, computers, tablet devices, and personal digital assistants, etc.

In some embodiments, the terms "include", "contain" or any other variants thereof are intended to cover non-exclusive inclusion, such that a process, a method, an article or a device including a series of elements not only includes those elements, but also includes other elements not explicitly listed, or elements inherent to the process, the method, the article, or the device. Without more restrictions, the element defined by the sentence "including a . . . " does not exclude the existence of other identical elements in the process, the method, the article, or the device that includes the element.

The numbers of the above embodiments of the present disclosure are for description only and do not represent the advantages and disadvantages of the embodiments.

Through the description of the above embodiments, those skilled in the art may clearly understand that the method of the above embodiments may be implemented by means of software plus necessary general hardware nodes. The method may also be implemented by hardware, but in many cases, the former is a better implementation manner. The technical solution of this application essentially or the part that contributes to the existing technology can be embodied in the form of a software product, and the computer software product stored in a storage medium (such as ROM/RAM, magnetic disk, optical disc) includes several instructions to enable a terminal device (such as the mobile phone, the computer, the server, an air conditioner, or a network device, etc.) to execute the methods described in the various embodiments of the present disclosure.

Embodiments of the present disclosure are described regarding flowcharts and/or block diagrams of methods, devices (systems), and computer program products. In some embodiment, each process and/or block of the flowchart and/or block diagram, and the combination of processes and/or blocks in the flowchart and/or block diagram may be implemented by computer program instructions. The computer program instruction is provided to the processor of a general-purpose computer, a special-purpose computer, an embedded processor, or other programmable data processing equipment to produce a machine, so that the instructions executed by the processor of the computer or other programmable data processing equipment are configured for implementing the functions specified in one flow or a plurality of flows in the flowchart and/or one block or multiple blocks in the block diagram.

The computer program instructions may also be stored in a computer-readable memory that can direct a computer or other programmable data processing equipment to work in a specific manner so that the instructions stored in the computer-readable memory produce an article of manufacture including the instruction device. The device implements the functions specified in one process or multiple processes in the flowchart and/or one block or multiple blocks in the block diagram.

These computer program instructions may also be loaded on a computer or other programmable data processing equipment, so that a series of operation processes are executed on the computer or other programmable equipment to produce computer-implemented processing, so as to execute on the computer or other programmable equipment. The instructions provide steps for implementing the functions specified in one process or multiple processes in the flowchart and/or one block or multiple blocks in the block diagram.

The above are only preferred embodiments of the present disclosure and do not limit the scope of this application. Any equivalent structure or equivalent process transformation made using the content of the description and drawings of the disclosure, or directly or indirectly used in other related technical fields are also included in the scope of patent protection of the present disclosure.

What is claimed is:

1. A control method comprising:
- obtaining a brightness level parameter of a display screen;
- controlling a refresh rate of the display screen at a target refresh rate in response to determining that the brightness level parameter is less than or equal to a target brightness level;
- generating display data at a control time interval and storing the display data in a buffer space; and
- obtaining the display data from the buffer space for display on the display screen based on a target time interval corresponding to the target refresh rate;
- wherein the control time interval is longer than the target time interval.

2. The control method of claim 1, wherein:
- the control time interval is a multiple of the target time interval.

3. The control method of claim 1, wherein generating the display data based on the control time interval includes:
- controlling a target application to update the display data in the buffer space based on the control time interval in response to a synchronization signal being received by the target application.

4. The control method of claim 3 further comprising:
- obtaining the synchronization signal; and
- determining whether to send the synchronization signal to the target application based on a control policy.

5. The control method of claim 4, wherein determining whether to send the synchronization signal to the target application based on the control policy includes:
- determining the control time interval corresponding to the target application based on the control policy;

sending the synchronization signal to the target application in response to the synchronization signal being associated with the control time interval, the synchronization signal being associated with the control time interval including that the synchronization signal is derived from candidate synchronization signals at the control time interval; and discarding the synchronization signal in response to the synchronization signal being not associated with the control time interval.

6. The control method of claim 3, further comprising:

obtaining an update rate and a display area of data in a target window, the target window including a data display window of a candidate application corresponding to the display data; and determining that the candidate application is the target application in response to the update rate meeting a first condition and the display area meeting a second condition, the first condition including that the update rate of first data is greater than the update rate of second data, the second condition including that a first display area is smaller than a second display area, the first display area including a display area of the first data in the target window, the second display area including a display area of the second data in the target window, the data displayed in the target window including the first data and the second data.

7. The control method of claim 1, wherein obtaining the display data based on the target time interval includes:

obtaining the display data based on the target time interval if the in response to an application corresponding to the display data is a target application.

8. An electronic device comprising:

a display screen; and a processor, the processor being configured to:

obtain a brightness level parameter of the display screen;

control a refresh rate of the display screen at a target refresh rate in response to determining that the brightness level parameter is less than or equal to a target brightness level;

generate display data at a control time interval and store the display data in a buffer space; and obtain the display data from the buffer space for display on the display screen based on a target time interval corresponding to the target refresh rate;

wherein the control time interval is longer than the target time interval.

9. The electronic device of claim 8, wherein:

the control time interval is a multiple of the target time interval.

10. The electronic device of claim 8, wherein the processor is further configured to:

control a target application to update the display data in the buffer space based on the control time interval in response to a synchronization signal being received by the target application.

11. The electronic device of claim 10, wherein the processor is further configured to:

obtain the synchronization signal; and determine whether to send the synchronization signal to the target application based on a control policy.

12. The control method of claim 11, wherein the processor is further configured to:

determine the control time interval corresponding to the target application based on the control policy;

send the synchronization signal to the target application in response to the synchronization signal being associated with the control time interval, the synchronization signal being associated with the control time interval including that the synchronization signal is derived from candidate synchronization signals at the control time interval; and discard the synchronization signal in response to the synchronization signal being not associated with the control time interval.

13. The electronic device of claim 10, wherein the processor is further configured to:

obtain an update rate and a display area of data in a target window, the target window including a data display window of a candidate application corresponding to the display data; and determine that the candidate application is the target application in response to the update rate meeting a first condition and the display area meeting a second condition, the first condition including that the update rate of first data is greater than the update rate of second data, the second condition including that a first display area is smaller than a second display area, the first display area including a display area of the first data in the target window, the second display area including a display area of the second data in the target window, the data displayed in the target window including the first data and the second data.

14. The electronic device of claim 8, wherein the processor is further configured to:

obtain the display data based on the target time interval in response to an application corresponding to the display data is a target application.

15. A non-transitory computer-readable storage medium containing computer-executable instructions that, when executed by a processor, causes the processor to:

obtain a brightness level parameter of a display screen;

control a refresh rate of the display screen at a target refresh rate in response to determining that the brightness level parameter is less than or equal to a target brightness level;

generate display data at a control time interval and store the display data in a buffer space; and obtain the display data from the buffer space for display on the display screen based on a target time interval corresponding to the target refresh rate;

wherein the control time interval is longer than the target time interval.

* * * * *